(12) United States Patent
Pais

(10) Patent No.: US 6,481,975 B1
(45) Date of Patent: Nov. 19, 2002

(54) GEAR PUMP AND SWITCH RELUCTANCE MOTOR AND METHOD FOR PUMPING FLUID

(75) Inventor: Martin R. Pais, North Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/520,136

(22) Filed: Mar. 7, 2000

(51) Int. Cl.[7] ................................................. F04B 35/04
(52) U.S. Cl. ....................... 417/53; 417/356; 417/410.4
(58) Field of Search ................................. 417/355, 356, 417/410.3, 410.4

(56) References Cited

U.S. PATENT DOCUMENTS

| | | | | |
|---|---|---|---|---|
| 2,557,879 A | * | 6/1951 | Lewis et al. ............. | 417/410.3 |
| 4,758,132 A | * | 7/1988 | Hartwig ...................... | 417/353 |
| 5,145,329 A | * | 9/1992 | Zumbusch et al. ......... | 417/356 |
| 5,439,357 A | * | 8/1995 | Barthold et al. ......... | 417/410.3 |

* cited by examiner

*Primary Examiner*—Charles G. Freay
(74) *Attorney, Agent, or Firm*—Steven A. May

(57) ABSTRACT

A pump and motor unit 100 and method for pumping fluids is provided. The pump and motor unit 100 comprises a pair of rotors 102 and 104 encased by a stator casing 106. Fluid is pumped into and out of the pump and motor unit 100 as the rotors 102 and 104 are rotated. The stator casing 106 seals the fluid around the rotors 102 and 104 and further generates a revolving magnetic field which rotates the rotors 102 and 104. The magnetic field may be generated by single phase current or by multiphase current. Both, or one, of the rotors 102 and 104 may be driven by the magnetic field. Rotors which are being driven are preferably fabricated from an iron-based material. Rotors which are not being driven are preferably fabricated from a non-magnetic material, such as carbon-nylon. Alternatively, the rotors 102 and 104 may comprise, at least in part, a permanent magnet material with brushless direct current motor technology being used to rotate the rotors.

18 Claims, 2 Drawing Sheets

GEAR PUMP AND SWITCH RELUCTANCE MOTOR AND METHOD FOR PUMPING FLUID

BACKGROUND OF THE INVENTION

The present invention relates generally to pumps and motors for driving the pumps and methods for efficiently and compactly pumping fluids.

Pumps for pumping fluids are used in a variety of applications. One application which requires a very efficient and compact pump/motor unit, is the cooling of electronic components. As electronic components continue to become smaller and smaller with more and more functionality, they are becoming increasingly sensitive to changes in temperature, and more particularly, to heat generated by their operation. Accordingly, systems for cooling electronic components have been developed in the art. For example, a fan driven by an electric motor has been used to force cooling air over electronic components. In addition, finned heat sink devices have been connected to electronic components, thereby increasing the surface area of the component from which heat is dissipated.

An additional method of cooling electronic components involves the use of compact, miniature motor and pump systems which pump dielectric fluids over high heat flux electronics. These systems desirably produce a low flow rate at a high pressure. Current motor and pump systems have various designs incorporating a variety of technologies. For example, DC motors, brushless DC motors, AC motors and switched reluctance motors (SRMs) have been used to power the pump. Various types of pumps, such as gear pumps, have been advantageously employed. However, further improvements in efficiency of operation and a reduction in size of these motor and pump systems are needed in the art.

Accordingly, this need is met by a system and method of the present invention which incorporates a motor and pump into a single unit and which provides an efficient and compact pump.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT

In accordance with the present invention, a pump and motor unit for pumping a fluid is provided which comprises a first rotor element and a second rotor element which rotates in association with the first rotor element to force the fluid into and out of the pump. The rotor elements are encased in a stator which magnetically rotates at least one of the first and second rotor elements and which substantially contains the fluid in association with the first and second rotor elements such that the fluid is forced into and out of the pump when the first and second rotor elements rotate.

A control circuit provides either single phase current or multiphase current to the stator to generate a revolving magnetic field which rotates at least one of the rotor elements. The first rotor element may be at least partially comprised of an iron-based material. If both rotor elements are being driven by the magnetic field created by the stator, both the first and second rotor elements are partially comprised of magnetic material. If only one rotor element is being driven, the other rotor element may be comprised of a non-magnetic material, such as a nylon-based material or carbon-nylon material. The first rotor element and second rotor element have respective first and second sets of teeth which mesh with each other when the first and second rotor elements rotate.

In accordance with another aspect of the present invention, a pump and motor unit for pumping a fluid comprises a rotor configuration for forcing the fluid into and out of the pump and motor unit and a stator for moving the rotor configuration and for substantially containing the fluid in association with the rotor configuration such that the fluid is forced into and out of the pump and motor unit when the rotor configuration moves. The rotor configuration may be magnetically moved, or rotated.

Figure 1:
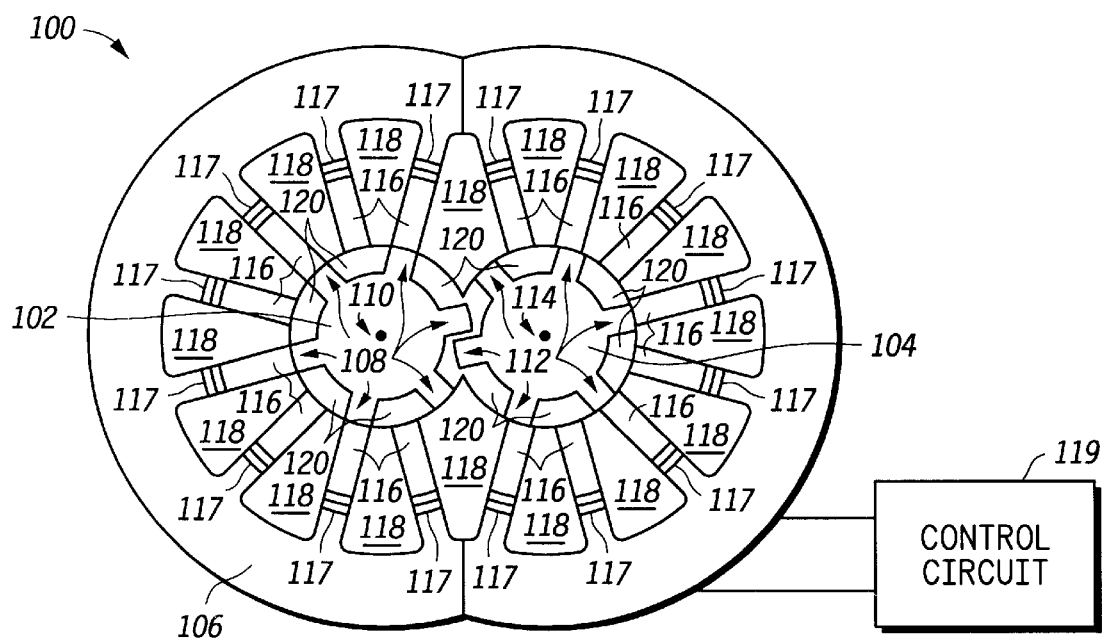
FIG. 1 is a schematic diagram of a pump and motor unit in accordance with an aspect of the present invention.

Referring now to FIG. 1, a pump and motor unit 100 in accordance with the present invention for pumping fluid is shown. The pump and motor unit 100 includes first and second rotor, or gear, elements 102 and 104 enclosed by a stator 106. Together, stator 106 and associated stator windings, or coils, 117 are collectively referred to herein as a stator assembly. The first rotor element 102 has a first set of teeth 108 extending radially therefrom and is rotatably mounted on a first axis 110. The second rotor element 104 has a second set of teeth 112 extending radially therefrom and is rotatably mounted on a second axis 114. At least one of the first and second rotor elements 102 and 104 may be comprised of soft-iron, or metallic material. As will be discussed below, one of the first and second rotor elements 102 and 104 may be comprised of a non-magnetic material.

Alternatively, the first and second rotor elements 102 and 104 may be comprised of magnets, or have magnets incorporated therein. The first and second rotor elements 102 and 104 could then be rotated using brushless DC motor technology.

The stator 106, which may preferably be comprised of iron, is shown having sixteen poles 116 which are used to generate a revolving magnetic field in a known manner to rotate at least one of the rotor elements 102 and 104. The poles 116 have independently wound wire windings, or coils, 117 so that current may be passed around each pole 116 in a predetermined manner to generate the revolving magnetic field. The current is supplied and/or controlled by a control circuit 119. Between the poles 116 is a filler material 118 which is appropriately selected to provide a fluid seal with the rotating teeth 108.

The control circuit 119 may provide current to the coils 117 in any number of manners. The control circuit 119 has independent control on each of the poles 116 using conventional electronic switching circuits. Thus, the magnetic excitation can be sequenced to each of the poles 116 to drive one or both of the rotors 102 and 104. Since each of the poles 116 are independently wound and independently controlled, or switched, the pump and motor unit 102 will still operate, albeit at a reduced performance, if any of the poles 116 is electrically disconnected.

Advantageously, only one of the rotor elements 102 and 104 need be driven by the magnetic field since the teeth of the driven rotor element 102 or 104 will mesh with the teeth of the other rotor element 104 or 102 and thereby drive the other rotor element 104 or 102. Such a design would be applicable to lower power applications. Alternatively and preferably for higher power applications, the magnetic field may drive both rotor elements 102 and 104. If only one of the rotor elements 102 or 104 is being driven, then the other rotor element 104 or 102 may be made of a non-magnetic material, such as carbon-nylon other material. If both rotor elements 102 and 104 are being driven, they are preferably made of a magnetic material, such as iron.

As each of the teeth 108 and 112 passes by a particular pole 116 and the filler material 118, a substantially hermetic seal is formed. Consequently, fluid is trapped in gear-pole interspaces 120 as the rotor elements 102 and 104 rotate from a fluid input to a fluid output. As is known in the art of gear pumps, the unmeshing of the teeth 108 and 112 as they rotate creates a partial vacuum which draws the fluid into the pump and motor unit 100. The fluid is then transferred in the gear-pole interspaces 120 (or between the rotor elements 102 and 104 and the stator assembly). When the rotating teeth 108 and 112 mesh together, there is an increase in pressure that forces the fluid into the fluid output.

The pump and motor unit 100 and method of the present invention advantageously provides an efficient, compact design which combines a motor and pump. The rotor elements 102 and 104 operate both as gears (for the pump) to force fluid into and out of the pump and motor unit and a rotor (for the motor) to generate mechanical power. Similarly, the stator assembly operates both as a fluid housing (for the pump) and a stator (for the motor). In effect, the present invention, in its preferred embodiment, provides a pump and motor unit design which combines the principles of switch reluctance motors (SRMs) and positive displacement gear pumps in a compact efficient manner.

Figure 2:
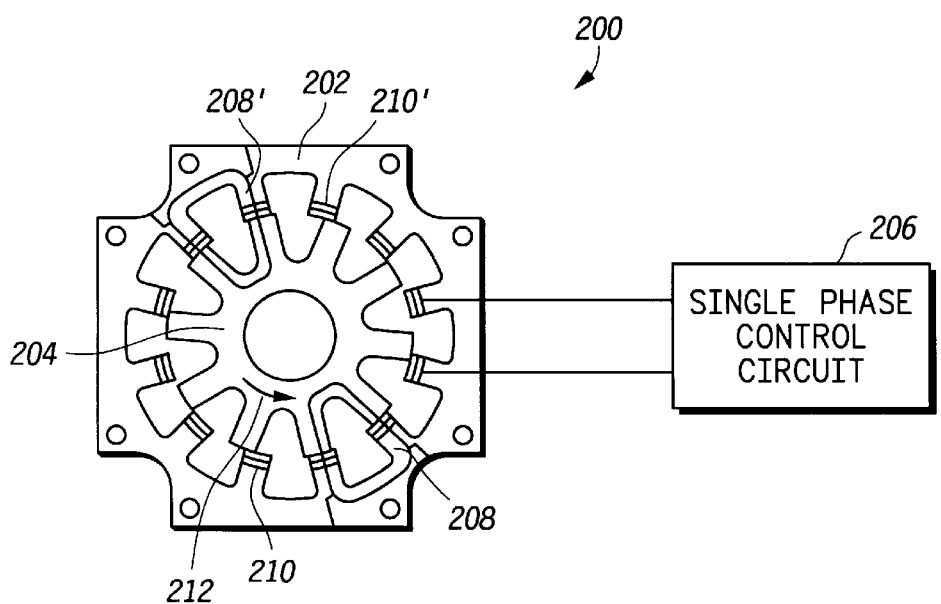
FIG. 2 is a schematic diagram of a single phase stator arrangement which may be used to rotate the rotor elements shown in FIG. 1, in accordance with one aspect of the present invention.
Figure 3:
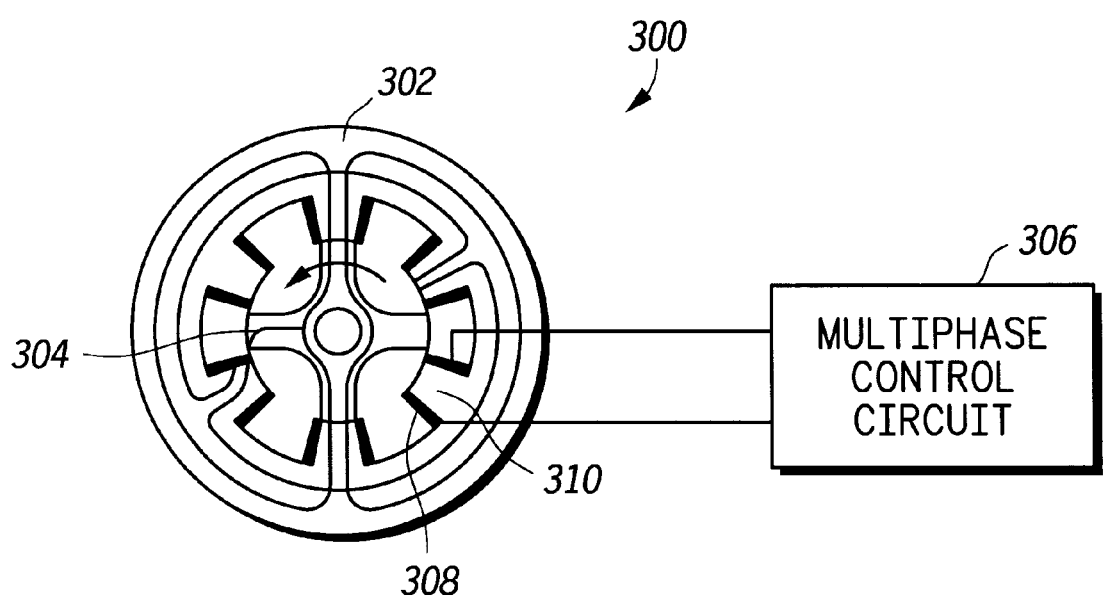
FIG. 3 is a schematic diagram of a multiphase stator arrangement which may be used to rotate the rotor elements shown in FIG. 1, in accordance with another aspect of the present invention.

FIGS. 2 and 3 show respective single and multiphase stator arrangements which may be utilized to drive the rotor elements 102 and 104. Single phase and multi-phase stator arrangements are well known in the art and, as such, will only be briefly discussed herein. FIG. 2 illustrates a single phase stator arrangement 200 including a stator 202 and a rotor 204. A single phase control circuit 206 provides a current to opposing poles, such as poles 208 and 208', to create a magnetic field which causes the rotor 204 to align two of its poles with the stator poles 208 and 208'. The single phase control circuit 206 then switches off the current to poles 208 and 208' and switches on current to poles 210 and 210'. The rotor 204 then rotates to align its poles with the stator poles 210 and 210'. The process is repeated as the rotor 204 is rotated in direction 212.

FIG. 3 shows a multiphase stator arrangement 300 having a stator 302 and a rotor 304. A multiphase control circuit 306 provides a multiphase current, such as a three phase alternating current, to coils 308 around poles 310 of the stator 302. The amplitude and the phases of the current are regulated by the control circuit 306 to generate a revolving magnetic field which rotates the rotor 304 in a known manner.

In accordance with the present invention, the control circuit 119 may provide either a single phase current or a multiphase current to the coils 117 to move one or both of the rotor elements 102 and 104.

While the invention may be susceptible to various modifications and alternative forms, specific embodiments have shown by way of example in the drawings and have been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A switch reluctance motor and pump unit for pumping a fluid comprising:

a stator assembly comprising a stator having coils wound in an axial format and further having at least two partially overlapping, cylindrical cavities, wherein an axis of a first cavity of the at least two partially overlapping cavities is parallel to an axis of a second cavity of the at least two partially overlapping cavities;

a first rotor element rotatably disposed in the first cavity of the at least two partially overlapping cavities, wherein the first rotor element comprises a first spur gear having a first set of teeth and wherein the first set of teeth project radially outward from the first spur gear and are axially oriented;

a second rotor element rotatably disposed in the second cavity of the at least two partially overlapping cavities, wherein the second rotor element comprises a second spur gear having a second set of teeth, wherein the second rotor element is disposed adjacent to the first rotor element, wherein the second set of teeth project radially outward from the second spur gear and are axially oriented, and wherein neither of the two rotor elements is disposed inside of the other rotor element; and wherein the stator assembly generates a radially aligned magnetic field, wherein the first set of teeth act as magnetic poles and interact with the magnetic field so as to produce a rotational movement of at least the first rotor element, wherein the second rotor element rotates in association with the rotation of the first rotor element, wherein the combined movement of the first rotor element and the second rotor element draws fluid into, and forces fluid out of, the pump and motor unit, and wherein the fluid is substantially contained between the stator assembly and the first and second rotor.

2. The pump and motor unit as recited in claim 1 wherein the second set of teeth act as magnetic poles and wherein the magnetic field generated by the stator assembly interacts with each of the first set of teeth and the second set of teeth so as to produce rotational movement of each of the first and second rotor elements.

3. The pump and motor unit as recited in claim 1 wherein the first set of teeth mesh with the second set of teeth and wherein a rotation of the first rotor element and the first set of teeth produces a rotational movement of the second rotor element.

4. The pump and motor unit as recited in claim 2, wherein the stator assembly further comprises stator windings, wherein the pump and motor unit further comprises a control circuit, and wherein the control circuit provides an excitation current to the stator windings that tends to cause a rotation of the at least one of the first and second rotor elements.

5. The pump and motor unit as recited in claim 4 wherein the excitation current is multiphase.

6. The pump and motor unit as recited in claim 1 wherein at least a portion of the first rotor element is comprised of a magnet.

7. The pump and motor unit as recited in claim 6 wherein the magnet is a permanent magnet.

8. The pump and motor unit as recited in claim 1 wherein the first rotor element is at least partially comprised of an iron-based material.

9. The pump and motor unit as recited in claim 8 wherein the second rotor element is comprised of a non-magnetic material.

10. The pump and motor unit as recited in claim 8 wherein the second rotor element is comprised of a nylon-based material.

11. The pump and motor unit as recited in claim 8 wherein the second rotor element is comprised of a carbon-nylon material.

12. The pump and motor unit recited in claim 1, wherein the stator comprises a plurality of poles, wherein the stator assembly further comprises a filler material disposed between each pole and an adjacent pole of the plurality of poles, and wherein the filler material provides a fluid seal between the stator assembly and the first and second rotor elements.

13. The pump and motor unit recited in claim 3, wherein the first set and second set of teeth mesh with each other when the first and second rotor elements rotate and wherein the meshing of the first set of teeth with the second set of teeth causes the rotation of the second rotor element.

14. The pump and motor unit recited in claim 3, wherein the first set and second set of teeth mesh with each other when the first and second rotor elements rotate and wherein the meshing of the first set of teeth with the second set of teeth forces the fluid out of the pump and motor unit and wherein the unmeshing of the two sets of the teeth draws the fluid into the pump and motor unit.

15. A method for pumping fluid through a switch reluctance motor and pump unit comprising a stator assembly, a first spur gear, and a second spur gear, the method comprising steps of:

generating a radial magnetic field by the stator assembly;

rotating the first spur gear in response to the generation of the magnetic field, wherein the first spur gear comprises a first set of teeth that project radially outward from the first spur gear and are axially oriented and wherein the first set of teeth act as magnetic poles and interact with the magnetic field so as to produce a rotational movement of the first spur gear;

rotating the second spur gear in response to the generation of the magnetic field, wherein the second spur gear comprises a second set of teeth that project radially outward from the second spur gear, are axially oriented, and mesh with the first set of teeth, and wherein the second spur gear is adjacent to, and external to, the first spur gear;

forcing fluid into and out of the pump in response to the rotation of the first and second spur gears; and wherein the fluid drawn into the pump is substantially contained between the stator assembly and the first and second spur gears.

16. The method as recited in claim 15, wherein the step of rotating the second rotor element comprises steps of:

applying the magnetic field to the second spur gear; and rotating the second spur gear in response to the application of the magnetic field, wherein the second spur gear comprises a second set of teeth and wherein the second set of teeth act as magnetic poles and interact with the magnetic field so as to produce a rotational movement of the second spur gear.

17. The method as recited in claim 15, wherein the second spur gear comprises a second set of teeth that mesh with the first set of teeth and wherein the step of rotating the second spur gear comprises a step of rotating the second spur gear based on the rotation of the first spur gear and the first set of teeth.

18. The method as recited in claim 15, wherein the second spur gear has a second set of teeth, wherein the first set of teeth and the second set of teeth mesh with each other when the first and second spur gears rotate, and wherein the step of forcing fluid into and out of the pump in response to the rotation of the first and second spur gears comprises steps of:

forcing fluid out of the pump in response to the meshing of the first set of teeth with the second set of teeth; and forcing fluid into the pump in response to the unmeshing of the first set of teeth with the second set of teeth.

\* \* \* \* \*